(12) United States Patent
Liu et al.

(10) Patent No.: US 10,377,874 B2
(45) Date of Patent: Aug. 13, 2019

(54) BIO-BASED FIRE RETARDANT DERIVED FROM POLYACRYLAMIDE GRAFTED STARCH AND USE THEREOF

(71) Applicant: Shenyang Shunfeng New Material Co., Ltd., Shenyang (CN)

(72) Inventors: Chunfeng Liu, Shenyang (CN); Huiyong Lv, Shenyang (CN); Yangsong Wang, Shenyang (CN); Na Li, Shenyang (CN); Jing Ge, Shenyang (CN); Yingxu Li, Shenyang (CN); Shuai Yu, Shenyang (CN); Meng Gao, Shenyang (CN)

(73) Assignee: Shenyang Shunfeng New Material Co., Ltd., Shenyang (CN)

( * ) Notice: Subject to any disclaimer, the term of this patent is extended or adjusted under 35 U.S.C. 154(b) by 0 days.

(21) Appl. No.: 15/800,375

(22) Filed: Nov. 1, 2017

(65) Prior Publication Data

US 2019/0127551 A1    May 2, 2019

(51) Int. Cl.
| | |
|---|---|
| *C08K 5/00* | (2006.01) |
| *C08K 5/52* | (2006.01) |
| *C08K 3/32* | (2006.01) |
| *C08L 43/02* | (2006.01) |
| *C08L 33/20* | (2006.01) |
| *C08K 5/5415* | (2006.01) |

(52) U.S. Cl.
CPC ............ *C08K 5/0066* (2013.01); *C08K 3/32* (2013.01); *C08K 5/5205* (2013.01); *C08K 5/5415* (2013.01); *C08L 33/20* (2013.01); *C08L 43/02* (2013.01); *C08K 2003/323* (2013.01); *C08L 2201/02* (2013.01)

(58) Field of Classification Search
CPC ................................................ C08K 5/0066
See application file for complete search history.

(56) References Cited

U.S. PATENT DOCUMENTS

| | | | |
|---|---|---|---|
| 3,635,857 A * | 1/1972 | Restaino et al. | C08F 251/00 204/157.63 |
| 7,611,771 B2 | 11/2009 | Ohara | |
| 8,834,750 B1 | 9/2014 | Glenn et al. | |
| 2010/0168284 A1 | 7/2010 | Gaggar et al. | |

FOREIGN PATENT DOCUMENTS

| | | |
|---|---|---|
| CN | 101429291 A | 5/2009 |
| CN | 101570325 A | 11/2009 |
| EP | 180795 A1 | 5/1986 |
| EP | 0924166 A1 | 6/1999 |

OTHER PUBLICATIONS

Zhu-Bao Shao, Cong Deng, Yi Tan, Li Yu, Ming-Jun Chen, Li Chen, and Yu-Zhong Wang, "Ammonium polyphosphate chemically-modified with ethanolamine as an efficient intumescent flame retardant for polypropylene", Journal of Materials Chemistry A, 2014, 2, 13955, DOI: 10.1039/c4ta02778g (11 pages).

Xin Wang,Yuan Hu,Lei Song,Shanyong Xuan, Weiyi Xing, Zhiman Bai, and Hongdian Lu, "Flame Retardancy and Thermal Degradation of Intumescent Flame Retardant Poly(lactic acid)/Starch Biocomposites", Ind. Eng. Chem. Res. 2011, 50, 713-720 (8 pages).

Jaber Nasrollah Gavgani, Hossein Adelnia, Gity Mir Mohamad Sadeghi, Farhad Zafari, "Intumescent Flame Retardant Polyurethane/ Starch Composites:Thermal, Mechanical, and Rheological Properties", Journal of Applied Polymer Science, Jun. 12, 2014, DOI: 10.1002/app.41158 (9 pages).

Shuidong Zhang, Fang Liu, Huaqiao Peng, Xiangfang Peng,Saihua Jiang,and Junsheng Wang,"Preparation of Novel c-6 Position Carboxyl Corn Starch by a Green Method and Its Application in Flame Retardance of Epoxy Resin", Industrial & Engineering Chemistry Research, DOI: 10.1021/acs.iecr.5b03266, Ind. Eng. Chem. Res. 2015, 54, 11944-11952 (9 pages).

* cited by examiner

*Primary Examiner* — Peter F Godenschwager
(74) *Attorney, Agent, or Firm* — Maier & Maier, PLLC

(57) ABSTRACT

A bio-based fire retardant derived from polyacrylamide grafted starch and use thereof. This disclosure relates to the field of polymer additives for improving fire safety of materials. Specifically, the present disclosure is bio-based material derived from polyacrylamide grafted starch as fire retardants to polymers. Moreover, the disclosure relates to their uses in the fields of coating, adhesive, etc.

11 Claims, No Drawings

BIO-BASED FIRE RETARDANT DERIVED FROM POLYACRYLAMIDE GRAFTED STARCH AND USE THEREOF

FIELD OF THE INVENTION

This invention relates to the field of polymer additives for improving fire safety of materials. Specifically, the present invention is bio-based material derived from polyacrylamide grafted starch as fire retardants to polymers. Moreover, the invention relates to their uses in the fields of coating, adhesive, etc.

BACKGROUND OF THE INVENTION

Polymeric materials have been used very widely in different widely, such as coating, construction, transport, etc. In order to improve the fire safety of polymers, series of fire retardants had been developed in the last 30 years. Halogenated fire retardants combined with antimony trioxide were regarded as efficient flame retardant to most of polymers, while they are facing the consideration of the environmental problems. The use of such fire retardants has been limited due to the environment concern. Therefore, development eco-friendly and green fire retardants are urgent and necessary.

Ammonium polyphosphate (APP) is widely used eco-friendly fire retardant to polymers due to its high contents of phosphorus (P) and nitrogen (N). However, it has low efficiency if it has been used only. Usually, it needs the char agent to improve the performance. Aiming to widen its applications in the polymer field, much work has been done in past 20 years, such as development of intumescent flame retardant (IFR) systems which needs three components: acid sources, blowing agent and carbonization agent. However, due to the incompatibility of three components, in most cases it would result in reducing the properties and performance.

European Patent No. 180795 (Werner et al.) showed flame retardant packages comprising microencapsulated ammonium polyphosphate within a melamine formaldehyde resin.

China Patent No. CN101429291A (Feng et al) disclosed microcapsule-coated modified ammonium polyphosphate. In comparison to untreated ammonium polyphosphate, the treated one owns good fluidity, compact and uniform coating.

U.S. Pat. No. 7,611,771 B2 (Kohei et al) disclosed the silicone resin was used to cover the polyphosphate compound, showing improved properties to the textile.

China Patent No. CN101570325A (Dai et al) disclosed ammonium polyphosphate were functionalized with silicone, which resulted in reduction in flammability of polymers.

EP Patent application (EP 0924166 A1) (Wang et al) described that ammonium polyphosphate were treated with triazine, which was improving the flame-retardant efficiency.

US Patent application (US20100168284 A1)(Gaggar et al.) disclosed a fire retardant composition comprising 40-66 wt % alkenyl aromatic resion, 9-33 wt % ammonium polyphosphate and 14-40 wt % starch and exhibited at least V-1 rating in UL94 test to the molded polymer.

(U.S. Pat. No. 8,834,750 B1) (Glenn, et al.) invented fire retardant compositions comprising clay and starch and uses thereof to protect structure and objects from fire.

In the paper (J. Mater. Chem. A, 2014, 2, 13955), Zhu-Bao Shao, et al, reported ethanolamine had been used to chemically modify ammonium polyphosphate via ion exchange reaction.

In the paper (Ind Eng Chem Res, 2011, 50, 713) Xin Wang et al., reported that adding 2.5 wt % starch to intumescent fire rertardant helped polylactic acid passed UL94 V-1 rating and LOI value at 28.5.

In the paper (J. Appl Polym Sci, 2014, 131, 41158) Gavgani et al., reported by addition of 10 wt % starch and 20 wt % intumescent fire rertardant to polyurethane increased the LOI value from 22 to 40 and UL94 V-0 rating.

In the paper (Ind Eng Chem Res, 2015, 54(48), 11944) Shuidong Zhang et al., developed oxidized corn starch and combined it with microencapsulated ammonium polyphosphate to epoxy resin, finding the final epoxy composites showed decreased peak of the heat release rate at 12.5 wt % additive.

In contrast to the previous arts, in this invention we disclose novel bio-based fire retardant derived from polyacrylamide grafted starch. Moreover, the present invention also provides its application, in particular in the coating field. In comparison to the traditional fire retardants and reported additives, the new compound in this invention owns: i) multi-fire retardant elements in one compounds based on the polyacrylamide grafted starch; ii) improved fire retardant performance compared to the physical blends of varied components. iii) Biobased and green fire retardants.

SUMMARY OF THE INVENTION

The present invention relates to bio-based fire retardants with high performance. These fire retardant additives are useful in the replacing low efficient fire retardant composition and therefore useful in many applications.

The main advantages of these bio-based fire retardants with respect to the state of art are:

Bio-Based compounds therefore environmental friendly

Not fossil-based

Non-toxic

High effectiveness on fire retardancy

A first aspect of the present invention relates to bio-based fire retardant described by the following general molecular formula I:

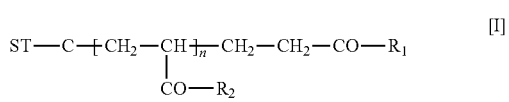

n: 100-10000, ST: starch wherein $R_1$ is selected from the list consisting of

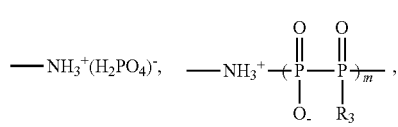

m: 100-5000, R3 is selected from the list consisting of $NH_3$,

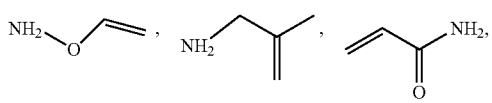

perfectly NH$_3$.

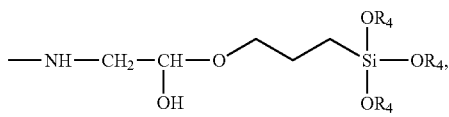

R4 is selected from the list consisting of —CH$_3$, —CH$_2$CH$_3$, —CH$_2$CH$_2$—CH$_3$.

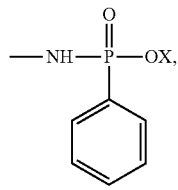

x is selected from the list consisting of NH$_4^+$, Na$^+$, K$^+$, etc.
R$_2$ is selected from the list consisting of

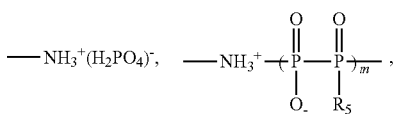

m: 100-5000, R5 is selected from the list consisting of NH$_3$,

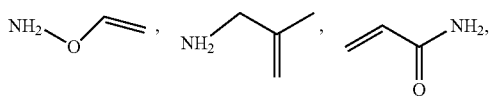

perfectly NH$_3$.

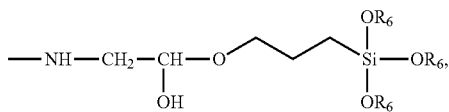

R6 is selected from the list consisting of —CH$_3$, —CH$_2$CH$_3$, —CH$_2$CH$_2$—CH$_3$.

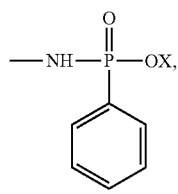

x is selected from the list consisting of NH$_4^+$, Na$^+$, K$^+$, etc.

A second aspect of the present invention is related to use of the new compounds as fire retardant to polymer, in particular in the coating field.

characterized in that it comprises:

a) use the invented compounds as fire retardant only to polymers b) Combination of the invented compounds with others, such as ammonium polyphosphate, clay, talc, metal oxide, Mg(OH)$_2$, Al(OH)$_3$, etc., to form eco-friendly fire retardant formulations.

Unless defined, all technical and scientific terms used in this invention have the same meaning as commonly understood by any of ordinary skilled in the art to which this invention belongs. Methods and materials similar or equivalent to those described herein can be used in the practice of the present invention. The advantages and features of the invention will become apparent to those skilled in the art upon examination of the description or may be learned by practice of the invention. The following examples are provided by way of illustration and are not intended to be limiting of the present invention.

DETAILED DESCRIPTION OF THE INVENTION

Example 1

The mixed solvent of water and acetone (ratio 100:5) was added in a three-neck round-bottom flask equipped with a stirrer in N2. Polyacrylamide grafted starch (5 g) and APP (10 g) were added in the flask. Then, the mixture was heated up to 75° C. with the release of ammonia for 6 h. Then, the reaction mixture was cooled down to room temperature.

After that, the mixture was concentrated and washed with ethanol. The white solid was filtered, and then the sample was dried in a vacuum oven at 80° C. for 12 h, the compound having the following structure was obtained. (yield>80%):

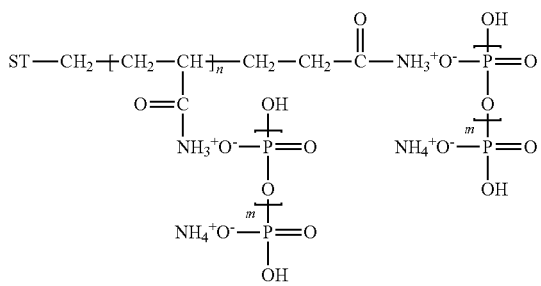

Example 2

The mixed solvent of water and ethanol (ratio 100:8) was added in a three-neck round-bottom flask equipped with a stirrer in N2. Polyacrylamide grafted starch (5 g) and APP (10 g) were added in the flask. Then, the mixture was heated up to 80° C. with the release of ammonia for 6 h. Then, the reaction mixture was cooled down to room temperature. After that, the mixture was concentrated and washed with ethanol. The white solid was filtered, and then the sample was dried in a vacuum oven at 80° C. for 12 h, the compound having the following structure was obtained (yield>85%):

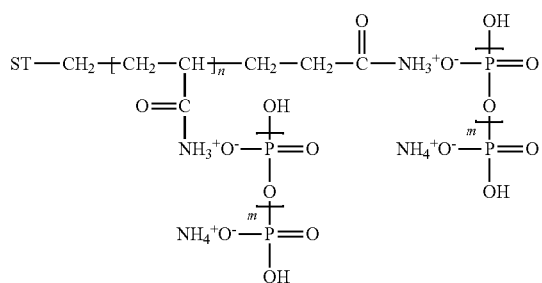

Example 3

The mixed solvent of water and ethanol (ratio 100:5) was added in a three-neck round-bottom flask equipped with a stirrer in N2. Glycidylpropyltrimethoxysilane (KH560, 3 g) and Polyacrylamide grafted starch (10 g) were added in the flask. Then, the mixture was heated up to 60° C. and kept for 4 h with stirring. Then, the reaction mixture was cooled down to room temperature. After that, the mixture was concentrated and washed with ethanol. The white solid was filtered, and then the sample was dried in a vacuum oven at 80° C. for 12 h, the compound having the following structure was obtained (yield>82%):

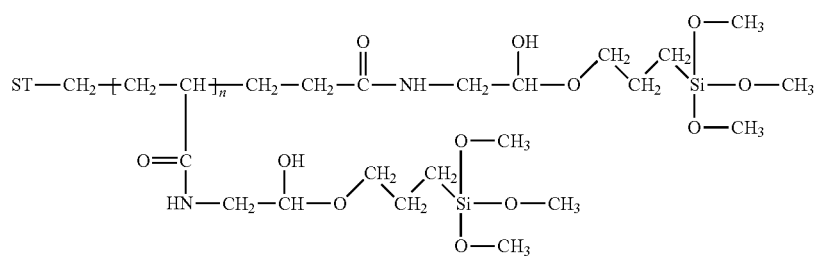

Example 4

The mixed solvent of water and ethanol (ratio 100:10) was added in a three-neck round-bottom flask equipped with a stirrer in N2. Glycidylpropyltrimethoxysilane (KH560, 4 g) and Polyacrylamide grafted starch (10 g) were added in the flask. Then, the mixture was heated up to 70° C. and kept for 5 h with stirring. Then, the reaction mixture was cooled down to room temperature. After that, the mixture was concentrated and washed with ethanol. The white solid was filtered, and then the sample was dried in a vacuum oven at 80° C. for 12 h, the compound having the following structure was obtained (yield>85%):

Example 5

The mixed solvent of water and ethanol (ratio 100:10) was added in a three-neck round-bottom flask equipped with a stirrer in N2. Polyacrylamide grafted starch (3 g) and APP (10 g) were added in the flask. Then, the mixture was heated up to 80° C. with the release of ammonia for 6 h. Then, the reaction mixture was cooled down to room temperature. After that, the mixture was concentrated and washed with ethanol. The white solid was filtered, and then the sample was dried in a vacuum oven at 80° C. for 12 h, the compound having the following structure was obtained (yield>88%):

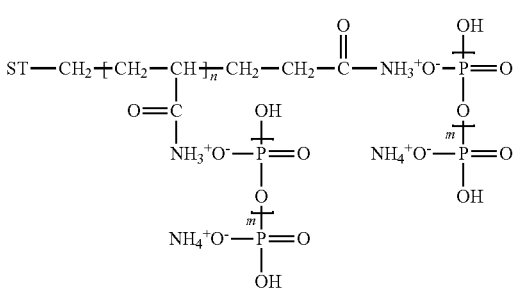

Example 6

The mixed solvent of water and ethanol (ratio 100:5) was added in a three-neck round-bottom flask equipped with a stirrer in N2. Polyacrylamide grafted starch (3 g) and $H_3PO_4$ (10 g) were added in the flask. Then, the mixture was heated up to 40° C. with the release of ammonia for 2 h. Then, the reaction mixture was cooled down to room temperature. After that, the mixture was concentrated and washed with water. The white solid was filtered, and then the sample was dried in a vacuum oven at 70° C. for 12 h, the compound having the following structure was obtained (yield>80%):

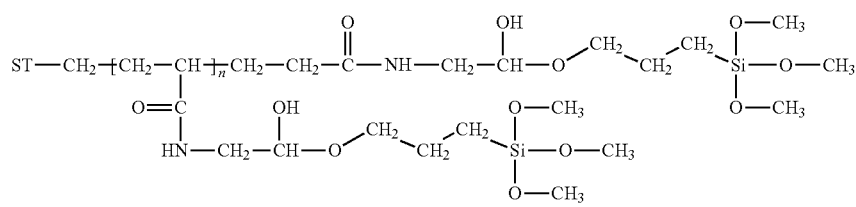

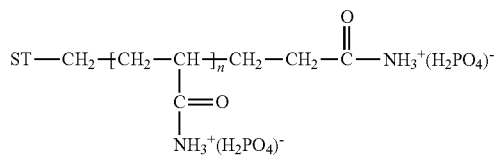

Example 7

The water was added in a three-neck round-bottom flask equipped with a stirrer in N2. Polyacrylamide grafted starch (2 g) and H$_3$PO$_4$ (12 g) were added in the flask. Then, the mixture was heated up to 60° C. for 6 h. Then, the reaction mixture was cooled down to room temperature. After that, the mixture was concentrated and washed with water. The white solid was filtered, and then the sample was dried in a vacuum oven at 70° C. for 12 h, the compound having the following structure was obtained (yield>82%):

Example 8

The water was added in a three-neck round-bottom flask equipped with a stirrer in N2. Polyacrylamide grafted starch (2 g) and 3-(hydroxyphenylphosphinyl)-propanoic acid (10 g) were added in the flask. Then, the mixture was heated up to 60° C. or 2 h. Then, the reaction mixture was added NaOH solution (0.1M) until pH value in the range of 6-8. Finally, the reaction was cooled down to room temperature. After that, the mixture was concentrated and washed with water. The white solid was filtered, and then the sample was dried in a vacuum oven at 70° C. for 12 h, the compound having the following structure was obtained (yield>82%):

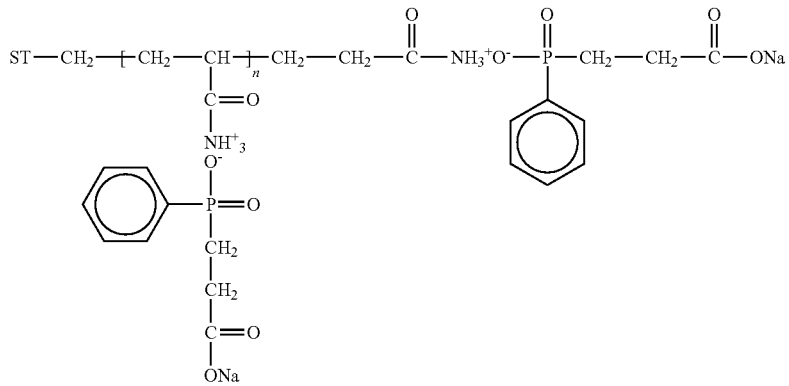

Example 9

The water was added in a three-neck round-bottom flask equipped with a stirrer in N2. Polyacrylamide grafted starch (2 g) and 3-(hydroxyphenylphosphinyl)-propanoic acid (10 g) were added in the flask. Then, the mixture was heated up to 60° C. or 4 h. Then, the reaction mixture was added KOH solution (0.1M) until pH value in the range of 6-8. Finally, the reaction was cooled down to room temperature. After that, the mixture was concentrated and washed with water. The white solid was filtered, and then the sample was dried in a vacuum oven at 70° C. for 12 h, the compound having the following structure was obtained (yield>80%):

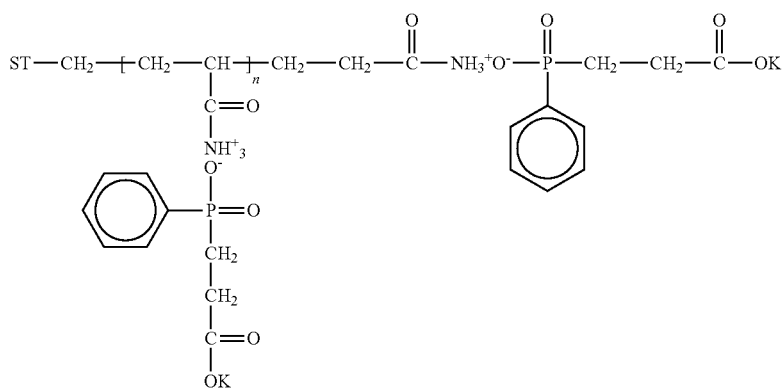

Example 10

Compound obtained according to example 1 was added into the commercialized PU resin at 15 wt % in order to prepare fire retardant coating resin. The fire retardant coating was used to treat wood board with the thickness of 0.5±0.1 mm. After fully cured of the resin, two fire tests, vertical burning test from profile (45 degree) and cone calorimeter test, were used to investigate the fire retardant efficiency of the fire retardant coating. Moreover, the polyacrylamide grafted starch in the Examples was used as reference.

TABLE 1

Fire retardant performance of PU coating and fire retardant PU coating

|  | pHRR (kW/m$^2$) | THR (MJ/m2) | TSP (m$^2$) | Extinguishement in vertical burning test |
|---|---|---|---|---|
| PU coating | 362 | 5.4 | 0.27 | No |
| PU/Compound-1 | 240 | 4.5 | 0.23 | Yes |
| PU/Reference | 320 | 5.0 | 0.26 | No |

Example 11

Compound obtained according to example 3 was added into the commercialized PU resin at 15 wt % in order to prepare fire retardant coating resin. The fire retardant coating was used to treat wood board with the thickness of 0.5±0.1 mm. After fully cured of the resin, two fire tests, vertical burning test from profile (45 degree) and cone calorimeter test, were used to investigate the fire retardant efficiency of the fire retardant coating. Moreover, the polyacrylamide grafted starch in the Examples was used as reference.

TABLE 2

Fire retardant performance of PU coating and fire retardant PU coating

|  | pHRR (kW/m$^2$) | THR (MJ/m2) | TSP (m$^2$) | Extinguishment in vertical burning test |
|---|---|---|---|---|
| PU coating | 362 | 5.4 | 0.27 | No |
| PU/Compound-3 | 260 | 4.7 | 0.24 | Yes |
| PU/Reference | 320 | 5.0 | 0.26 | No |

Example 12

Compound obtained according to example 6 was added into the commercialized PU resin at 15 wt % in order to prepare fire retardant coating resin. The fire retardant coating was used to treat wood board with the thickness of 0.5±0.1 mm. After fully cured of the resin, two fire tests, vertical burning test from profile (45 degree) and cone calorimeter test, were used to investigate the fire retardant efficiency of the fire retardant coating. Moreover, the polyacrylamide grafted starch in the Examples was used as reference.

TABLE 3

Fire retardant performance of PU coating and fire retardant PU coating

|  | pHRR (kW/m$^2$) | THR (MJ/m2) | TSP (m$^2$) | Extinguishment in vertical burning test |
|---|---|---|---|---|
| PU coating | 362 | 5.4 | 0.27 | No |
| PU/Compound-6 | 268 | 4.8 | 0.25 | Yes |
| PU/Reference | 320 | 5.0 | 0.26 | No |

Example 13

Compound obtained according to example 6 was added into the commercialized PU resin at 15 wt % in order to prepare fire retardant coating resin. The fire retardant coating was used to treat wood board with the thickness of 0.5±0.1 mm. After fully cured of the resin, two fire tests, vertical burning test from profile (45 degree) and cone calorimeter test, were used to investigate the fire retardant efficiency of the fire retardant coating. Moreover, the polyacrylamide grafted starch in the Examples was used as reference.

TABLE 4

Fire retardant performance of PU coating and fire retardant PU coating

|  | pHRR (kW/m$^2$) | THR (MJ/m2) | TSP (m$^2$) | Extinguishment in vertical burning test |
|---|---|---|---|---|
| PU coating | 362 | 5.4 | 0.27 | No |
| PU/Compound-8 | 262 | 4.7 | 0.24 | Yes |
| PU/Reference | 320 | 5.0 | 0.26 | No |

Example 14

Compound obtained according to example 2 was combined with ammonium polyphosphate with mass ration at 1:2 (compound mix-1), then the mixture was added into the commercialized PU resin at 15 wt % in order to prepare fire retardant coating resin. The fire retardant coating was used to treat wood board with the thickness of 0.5±0.1 mm. After fully cured of the resin, two fire tests, vertical burning test from profile (45 degree) and cone calorimeter test, were used to investigate the fire retardant efficiency of the fire retardant coating. Moreover, the polyacrylamide grafted starch in the Examples was used as reference.

TABLE 5

Fire retardant performance of PU coating and fire retardant PU coating

|  | pHRR (kW/m$^2$) | THR (MJ/m2) | TSP (m$^2$) | Extinguishment in vertical burning test |
|---|---|---|---|---|
| PU coating | 362 | 5.4 | 0.27 | No |
| PU/Compound-mix1 | 220 | 4.0 | 0.21 | Yes |
| PU/Reference | 320 | 5.0 | 0.26 | No |

Example 15

Compound obtained according to example 2 was combined with ammonium polyphosphate and nanoclay with mass ration at 1:2:0.2 (compound mix-2), then the mixture was added into the commercialized PU resin at 15 wt % in order to prepare fire retardant coating resin. The fire retardant coating was used to treat wood board with the thickness of 0.5±0.1 mm. After fully cured of the resin, two fire tests, vertical burning test from profile (45 degree) and cone calorimeter test, were used to investigate the fire retardant efficiency of the fire retardant coating. Moreover, the polyacrylamide grafted starch in the Examples was used as reference.

TABLE 6

Fire retardant performance of PU coating and fire retardant PU coating

| | pHRR (kW/m$^2$) | THR (MJ/m2) | TSP (m$^2$) | Extinguishment in vertical burning test |
|---|---|---|---|---|
| PU coating | 362 | 5.4 | 0.27 | No |
| PU/Compound-mix2 | 210 | 3.9 | 0.19 | Yes |
| PU/Reference | 320 | 5.0 | 0.26 | No |

Example 16

Compound obtained according to example 3 was combined with ammonium polyphosphate with mass ration at 1:2 (compound mix-3), then the mixture was added into the commercialized PU resin at 15 wt % in order to prepare fire retardant coating resin. The fire retardant coating was used to treat wood board with the thickness of 0.5±0.1 mm. After fully cured of the resin, two fire tests, vertical burning test from profile (45 degree) and cone calorimeter test, were used to investigate the fire retardant efficiency of the fire retardant coating. Moreover, the polyacrylamide grafted starch in the Examples was used as reference.

TABLE 7

Fire retardant performance of PU coating and fire retardant PU coating

| | pHRR (kW/m$^2$) | THR (MJ/m2) | TSP (m$^2$) | Extinguishment in vertical burning test |
|---|---|---|---|---|
| PU coating | 362 | 5.4 | 0.27 | No |
| PU/Compound-mix3 | 232 | 4.2 | 0.22 | Yes |
| PU/Reference | 320 | 5.0 | 0.26 | No |

Example 17

Compound obtained according to example 3 was combined with ammonium polyphosphate and nanoclay with mass ration at 1:2:0.2 (compound mix-4), then the mixture was added into the commercialized PU resin at 15 wt % in order to prepare fire retardant coating resin. The fire retardant coating was used to treat wood board with the thickness of 0.5±0.1 mm. After fully cured of the resin, two fire tests, vertical burning test from profile (45 degree) and cone calorimeter test, were used to investigate the fire retardant efficiency of the fire retardant coating. Moreover, the polyacrylamide grafted starch in the Examples was used as reference.

TABLE 8

Fire retardant performance of PU coating and fire retardant PU coating

| | pHRR (kW/m$^2$) | THR (MJ/m2) | TSP (m$^2$) | Extinguishment in vertical burning test |
|---|---|---|---|---|
| PU coating | 362 | 5.4 | 0.27 | No |
| PU/Compound-mix4 | 215 | 4.0 | 0.20 | Yes |
| PU/Reference | 320 | 5.0 | 0.26 | No |

The invention claimed is:
1. A compound characterized by the following general formula [I]:

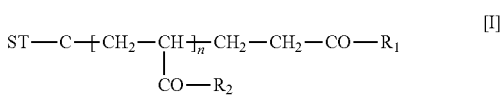

wherein:
n is 100-10000;
ST is starch;
$R_1$ is selected from the group consisting of

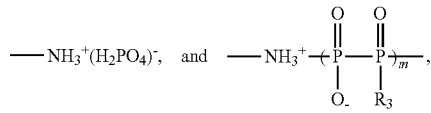

wherein m is 100-5000,
$R_3$ is selected from the group consisting of $NH_3$, and

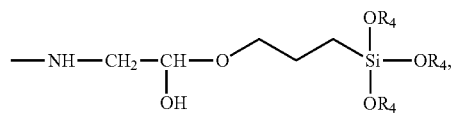

wherein $R_4$ is selected from the group consisting of —$CH_3$, —$CH_2CH_3$, —$CH_2CH_2$—$CH_3$, and

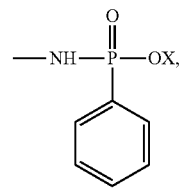

wherein X is selected from the group consisting of $NH_4^+$, $Na^+$, and $K^+$,
$R_2$ is selected from the group consisting of

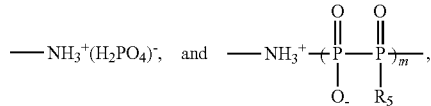

wherein m is 100-5000,
$R_5$ is selected from the group consisting of $NH_3$,

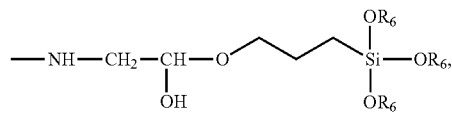

wherein R6 is selected from the group consisting of —CH$_3$, —CH$_2$CH$_3$, —CH$_2$CH$_2$—CH$_3$, and

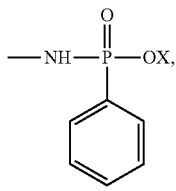

wherein X is selected from the group consisting of NH$_4^+$, Na$^+$, and K$^+$.

2. A method for preparing the compound of claim 1, comprising:
providing a solvent comprising water and, optionally, an organic solvent;
adding polyacrylamide grafted starch and a compound selected from the group consisting of ammonium polyphosphate, glycidylpropyltrimethoxysilane, H$_3$PO$_4$, and 3-(hydroxyphenylphosphinyl)-propanoic acid to the solvent;
stirring under N$_2$ to form a mixture,
heating the mixture to 40-80° C. for 2 to 6 h such that the polyacrylamide grafted starch and the compound react to form a solid product;
cooling the mixture down to room temperature;
filtering the solid product from the mixture, cleaned, and dried in a vacuum oven at 80° C. for 12 h.

3. The method of claim 2, wherein the organic solvent is selected from the group consisting of acetone, methanol, ethanol, isopropanol, chloroform and tetrahydrofuran.

4. The method of claim 3, wherein the organic solvent is ethanol or acetone.

5. The method of claim 2, wherein the ratio of organic solvent to water ratio is 0-0.1:1.

6. A fire retardant compound, formulation, and/or composite comprising the compound according to claim 1.

7. The compound of claim 1, wherein R$_3$ is NH$_3$.

8. The compound of claim 1, wherein R$_5$ is NH$_3$.

9. A fire retardant formulation comprising:
the compound of claim 1; and
one or more additives and/or polymers.

10. The fire retardant formulation of claim 9, wherein the one or more additives are selected from the group consisting of nanoclay, metal oxides, talc, Mg(OH)$_2$, ammonium polyphosphate, Al(OH)$_3$, intumescent flame retardants and Sb$_2$O$_3$.

11. The fire retardant formulation of claim 9, wherein the polymers are selected from the group consisting of polyurethane, polypropylene, polyethylene, rubber, polyvinyl chloride, polylactic acid, epoxy, ethylene vinyl acetate, polyamide, polyvinyl alcohol, and polyimide.

* * * * *